United States Patent [19]
Hyodo et al.

[11] Patent Number: 4,681,783
[45] Date of Patent: Jul. 21, 1987

[54] TUBULAR LINING MATERIAL FOR PIPE LINES

[75] Inventors: Masakatsu Hyodo; Isaburo Yagi, both of Osaka, Japan

[73] Assignee: Ashimori Industry Co., Ltd., Japan

[21] Appl. No.: 809,865

[22] Filed: Dec. 17, 1985

[30] Foreign Application Priority Data

Dec. 18, 1984 [JP] Japan .................. 59-265271

[51] Int. Cl.[4] ........................... F16L 35/16
[52] U.S. Cl. ........................ 428/36; 138/98;
138/124; 138/125; 138/145; 139/387 R;
156/287
[58] Field of Search ............... 138/98, 124, 125, 126,
138/145; 139/387 R; 156/287; 428/36

[56] References Cited
U.S. PATENT DOCUMENTS

| | | | |
|---|---|---|---|
| 3,022,802 | 2/1962 | Lewis | 138/125 |
| 3,866,631 | 2/1975 | Chudgar | 138/125 |
| 4,190,088 | 2/1980 | Lalikos et al. | 138/125 |
| 4,334,943 | 6/1982 | Zenbayashi et al. | 156/287 |
| 4,368,091 | 1/1983 | Ontsuga et al. | 156/287 |
| 4,576,205 | 3/1986 | Morinago et al. | 138/125 |

*Primary Examiner*—John E. Kittle
*Assistant Examiner*—James J. Seidleck
*Attorney, Agent, or Firm*—Birch, Stewart, Kolasch & Birch

[57] ABSTRACT

A tubular lining material for reinforcing pipe lines, which has a double-layered structure comprising an air-impervious outer tubular textile jacket provided on the inside thereof with a reinforcing inner tubular textile jacket, characterized in that the reinforcing tubular textile jacket is more coarse in weaving density and larger in diameter than the air-impervious tubular textile jacket and that the product of the length of the diameter and the elongation ratio in the direction of the diameter on fracture, of the air-impervious tubular textile jacket is approximately equal to the product of the length of the diameter and the elongation ratio in the direction of the diameter on fracture of the reinforcing tubular textile jacket. The tubular lining material is excellent in both pressure-resistance and earthquake-resistance so that even if the pipe lines are cracked or broken off by strong external force caused, for example, by earthquake, the tubular lining material is merely detached from the damaged pipe lines, without being destroyed, to maintain its function of providing a passageway for a fluid transported under high pressure.

10 Claims, 5 Drawing Figures

TUBULAR LINING MATERIAL FOR PIPE LINES

BACKGROUND OF THE INVENTION

1. Field of the Invention

The present invention relates to a tubular lining material for pipe lines made of steel or the like metals, concrete pipes or rigid resinous pipes, such as gas conduits, city water pipe lines, sewage pipes, oil pipe lines and pipes enclosing power transmission wires or telecommunication cables, especially those already constructed and buried in the ground. More particularly, the present invention relates to a tubular lining material utilizable for reinforcing such pipe lines, especially underground pipe lines to protect them from any strong external shock and capable of being substituted for the pipe lines when they are cracked or broken off, which comprises a tubular textile jacket overlaid with an air-impervious coat of a synthetic resin and provided on the inside thereof with a specific reinforcing tubular textile jacket. The tubular lining possesses earthquake-resistance and pressure-resistance to a fluid transported under high pressure in addition to possessing the properties required for conventional tubular lining material.

2. Description of the Prior Art

In recent years, a tubular lining material was used for the purpose of repair and reinforcement of damaged or superannuated pipe linees which had been constructed and buried in the ground, since pipe-enchange works especially for underground pipe lines involved much cost and difficulty. Pipe-lining methods developed at an early stage, for example, those disclosed in U.S. Pat. Nos. 2,794,784, 3,132,062 and 3,494,813 and British Pat. No. 1,002,131, were rather primitive and had a number of drawbacks in actual pipe-lining operations. Under the circumstances, various improvements were made in both pipe-lining methods and lining materials used therein. Recently, several improved lining methods have been proposed, for example, in Japanese Patent Publn. Nos. 58-38088, 58-51654 and 59-12911, Japanese Laid-open Patent Appln. Nos. 56-115213 and 57-38114, and U.S. Pat. Nos. 4,368,091, 4,334,943, 4,350,548 and 4,427,480 and have been noted as excellent methods for lining pipe lines. According to these methods now attracting commercial interest, a tubular lining material having a binder applied onto the inner surface thereof is inserted into pipe lines and allowed to advance therein while turning it inside out (evagination), whereby the lining material is bonded onto the inner surface of the pipe lines with the binder being interposed therebetween. The method disclosed in U.S. Pat. No. 4,334,943 involves, in addition to the above fundamental construction, an improvement wherein a belt is previously passed through a tubular lining material beyond the full length thereof prior to applying a binder evenly onto the inner surface of the lining material and, when the lining material is inserted into a pipe line from one end thereof and allowed to advance within the pipe line while effecting evagination of the lining material and simultaneous application of the binder onto the inner surface of the pipe line under fluid pressure, the belt is drawn at a constant rate from the opposite end of the pipe line, thereby reducing the high fluid pressure necessary for evagination and advancement of the lining material and controlling the evagination speed so as to prevent any locally uneven application of the lining material, especially in curved or bent portions of the pipe line. The method disclosed in these patents is generally called "evagination-lining method" and is considered to be excellent in the existing pipe-lining methods, particularly in that such lining material can easily be inserted into pipe lines to be treated and is applicable to pipe lines having a plurality of bends or curved portions within a shorter period of time irrespective of the length and diameter of the pipe lines. Up to date, a combination of the methods disclosed in U.S. Pat. Nos. 4,334,943 and 4,427,480 is regarded as one of the most advantageous methods for lining pipe lines.

On the other hand, various kinds of tubular lining materials have been used as lining materials for pipes or pipe lines. In Japanese Patent Publn. No. 55-43890 (British Pat. No. 1,449,455), for example, there is disclosed a lining material comprised of a material comprising felt and/or fabric and a flexible foamed material and having an impervious membrane coated thereon. Japanese Patent Publn. No. 58-33098 discloses a lining material manufactured from a flat web laminate comprising resin-absorbed layers with an impervious layer on one side thereof, both ends thereof having been sewn with a thread to form a tubular shape having an impervious layer disposed on the external surface thereof. The sewn area is covered with a ribbon or a coating. The Japanese publication also discloses a method for manufacturing the lining material. In U.S. Pat. Nos. 4,334,943 and 4,368,091, there is disclosed a tubular lining material comprised of a tubular textile jacket made of warps and a weft woven in a tubular form and overlaid with an air-impervious coat of a flexible synthetic resin. Further, Japanese Laid-open Utility Model Appln. No. 56-3619 discloses a tubular lining material comprised of a similar tubular textile jacket overlaid with a coat of an elastic rubber synthetic resin. In Japanese Laid-open Patent Appln. No. 56-8229 aiming at an improvement of the above tubular lining material, there is disclosed a tubular lining material comprised of a tubular textile jacket made of fibers woven into a tubular form having a coat of a rubbery or plastic material on the external surface thereof and capable of expanding by 7-15% in outer diameter when a pressure equal to the minimum fluid pressure is applied. Recent Japanese Patent Appln. No. 58-102361 discloses a tubular lining material comprised of a tubular textile jacket consisting of warps and a weft made of synthetic fibers and woven in a tubular form laminated on its outer or inner surface with another tubular textile jacket and having on the exterior surface thereof an air-impervious layer of a synthetic resin.

In case the pipe-lining methods of the above mentioned type are applied to pipe lines for transporting fluids, such as gas conduits, city water pipe lines, sewage pipes, oil pipe lines, etc. a tubular lining material used for these methods are originally required to possess air- or fluid-impervious property for not permitting any leakage of the transported fluid; flexibility in compliance with curved or bent portions of the pipe lines; strength capable of withstanding the pressure of the fluid; durability of the cost, etc. As the pipe-lining method of this type, i.e. the so-called "evagination-lining" method has spread, however, various characteristics have required for the tubular lining material according to the environment of the pipe lines and the nature of the ground. In general, it is extremely difficult to satisfy all of these various characteristics since a noticeable improvement in one of the characteristics of the lining material may adversely affect the other characteristics. For example, when a tubular lining material is applied onto the inner surface of a pipe line by inserting the lining material into the pipe line and allowing the lining material to advance within the pipe line while turning the tubular lining material inside out and bonding it onto the inner surface of the pipe line by the aid of a binder, reduction in thickness or strength of the lining material for the purpose of facilitating the evagination operation will make the lining material less tolerant to the pressure of a fluid transported through the pipe line under high pressure and will eventually be destroyed if the pipe line is cracked or broken off. On the other hand, if the strength or thickness of the tubular lining material is increased, the lining material itself becomes rigid and can hardly be evaginated. If an attempt is made to improve the individual characteristics of the lining material, therefore, careful attention will be necessary lest the other characteristics should adversely be affected by such improvement.

A prime object of a tubular lining material for pipe lines resided in reinforcement of the pipe lines. At present, the application of a tubular lining material is desired for the purpose of reinforcing pipe lines for transporting a high pressure fluid, for example, a gas conduit, particularly, a moderate pressure line A (3-10 kg/cm$^2$ in pressure on actual use), an oil conduit (2-13 kg/cm$^2$ in pressure on actual use), a city water pipe line (2-7 kg/cm$^2$ in pressure on actual use), etc. In the case of the city water pipe line, an asbestos pipe line of city water grade is frequently used which originally has a pressure resistrance as high as 30 kg/cm$^2$ but gradually deteriorates with the lapse of time so that its pressure resistance ultimately drops to a few kg/cm$^2$. Besides the pressure-resisting property, a strong resistance to cracking or destruction of the pipe line caused by external shock, represented by earthquake-resistance, is also desired for such pipe lines including city water asbestor pipe lines. In the caes of pipe lines for a high pressure fluid, damages caused by the destruction of pipe lines will be serious. Thus, a tubular lining material used for such pipe lines is required to possess such function that it should not be destroyed and can be substituted for pipe lines even if the pipe lines are destroyed by strong external shock. Similarly, the tubular lining material along should desirably maintain the function of a passageway for the high pressure city water even if the asbestos pipe lines are superannuated and significantly cracked or destroyed in the lengthwise direction. In case such a strength that a lining material alone should withstand the pressure of the transported fluid is desired for the lining material, such demand will become servere if the diameter of the pipe lines is larger. Further, the tubular lining material should not be firmly bonded to the pipe lines because it might be cracked or broken off together with the pipe lines themselves. If the pipe lines are cracked or broken off by a strong external force caused, for example, by earthquake, the tubular lining material should peel off from the damaged pipe lines, without being destroyed in order, to maintain the function of a passageway for high pressure fluid.

The term "earthquake-resistance" used herein means the specific characteristics of the tubular lining material. In other words, the term "earthquake-resistance" is herein used to mean a combination of the earthquake-absorbing property and the earthquake-proofing property which assures the function of a passageway for a high pressure fluids using only the tubular lining material when the pipe lines are cracked or broken off. In order to furnish a tubular lining material with earthquake-resistance, the tubular lining material should possess both a sufficiently high tenacity in the lengthwise direction and a satisfactory strength to such a degree that the lining material should not be broken down prior to shearing destruction of a binder existing between the pipe lines and the lining material. In case the pipe lines are buried in soft ground or reclaimed land, the pipe lines may be cracked or broken off because of a dip in the ground or an earthquake occurs. Even if the pipe lines per se are cracked or broken off, the tubular lining material possessing earthquake-resistance can be split off from the damaged pipe lines by shearing destruction of the solidified binder and can still function as a passageway for the high pressure fluid. Thus, the earthquake-resistance is one of the most important characteristics for the pipe lines which are buried in soft ground or reclaimed land or in a district where big earthquakes are anticipated. In the prior art tubular lining materials, however, no consideration has been earthquakeresistance.

In case a fluid flowing out from the damaged pipe lines is not particularly harmless to the environment, it may be necessary in some cases that the structure of the tubular lining material is purposely modified to form a weak portion where a partial destruction of the lining material may occur. For example, when city water pipe lines are destroyed by external force to form big cracks in the lengthwise direction, the tubular lining material, having such modified structure is not destroyed concurrently but rather forms a minor crack to permit water to leak out thereby facilitating the detection of the damaged portion of the city water pipe lines buried in the ground. It is a mater of course that such technical concept is not at all recognized in the prior art tubular lining materials.

If an attempt is made to manufacture from a single layer tubular textile jacket, a tubular lining material having high pressure-resistance, and warranted earthquake-resistance even in case of pipe lines with a large diameter, a number of threads are required for warps and a weft so that the resultant tubular lining material becomes too rigid to be evaginated when applied to the pipe lines, and even if evaginated, it will afford a rough, non-smooth surface and lack good compliance with the curved or bent portions of the pipe lines. Thus, a plurality of tubular textile jackets are required for the manufacture of a tubular lining material possessing both pressure-resistance and earthquake-resistance. As the tubular lining material is applied onto the inner surface of the pipe lines by evagination, however, it is important that a tubular lining material comprising a plurality of layers of a tubular textile jacket should be flexible and need not require a high fluid pressure for the evagination operation. In general, the evagination operation becomes difficult as the thickness of the textile jacket layer becomes greater. Consequently, moderate flexibility is also required, in addition to the pressure- and earthquake-resistance, for the tubular lining material. The prior art tubular lining materials can satisfy a part of these necessary properties but fail to satisfy all of these properties.

For example, the tubular lining materials disclosed in Japanese Patent Publns. Nos. 55-43890 and 58-33098 which employ unwoven fabrics as reinforcing fabrics lack the earthquakeresistance because of poor strength of the unwoven fabrics and are inferior in the pressure-resistance. The tubular lining materials disclosed in Japanese Laid-open Utility Model Appln. No. 56-3619 and Japanese Laid-open Patent Appln. No. 56-8229 which employ woven fabrics basically as reinforcing textile materials are improved in strength. These tubular lining materials can be enhanced in strength to maintain satisfactory earthquake-resistance and pressure-resistance by making the fabric structure finer but on the other hand become rigid because of the stiffness of threads finely woven to form the fabrics so that the lining materials incur the following drawbacks: the evagination operation for applying the lining materials onto the inner surface of pipe lines becomes difficult; the surface of the lining materials forms a concave or convex structure which inceases the flow resistance of a transported fluid; and the fine fabric structure cannot hold a binder in a sufficient amount. The latest tubular lining material disclosed in Japanese Patent Appln. No. 58-102361 which has a double-layered structure satisfies all of the above mentioned necessary properties to a certain degree but no consideration is made on impregnation with a binder, especially a sufficient amount of an epoxy resin so that a problem arises in the bonding of the lining material onto the inner surface of pipe lines.

In the above mentioned circumstances, there is a great demand for the development of a new type tubular lining material which possesses high pressure-resistance and satisfactory earthquake-resistance in addition to all the necessary properties required for tubular lining materials. Standing on this viewpoint, the present invention has been accomplished to make further improvement in the tubular lining material disclosed in Japanese Patent Appln. No. 58-102361.

BRIEF SUMMARY OF THE INVENTION

Accordingly, it is an object of the present invention to provide a tubular lining material for reinforcing pipe lines which possesses high pressure-resistance and warranted earthquake-resistance in addition to good flexibility capable of evagination and good binder-absorbing property.

It is another object of the present invention to provide an improved tubular lining material of a double-layered structure for reinforcing pipe lines which comprises a tubular textile jacket overlaid with an air-impervious coat of a synthetic resin and provided on the inside thereof with a reinforcing tubular textile jacket, wherein these textile materials are furnished with specific structures and characteristics.

It is still another object of the present invention to provide a tubular lining material for reinforcing pipe lines which possesses earthquake-resistance and pressureresistance sufficient enough to maintain itself as having the function of a passageway even if the pipe lines or joint parts thereof are cracked or broken off and the tubular lining material is peeled off from the pipe lines or joint parts thereof by an external force stonger than the bonding strength of the binder used.

It is a further object of the present invention to provide a tubular textile jacket for reinforcing pipe lines which contains at given intervals in the lengthwise direction a portion where the strength is decreased so that when the pipe lines are greatly damaged in the lengthwise direction, the lining matterial may also be damaged only in the portion to provide a means for detecting the location of the damage portion of the pipe lines by the leakage of a minimum amount of a fluid transported through the pipe lines.

Other objects, features and advantages of the present invention will become apparent more fully from the following description.

BRIEF DESCRIPTION OF THE DRAWINGS

The present invention can more fully be understood from the following description taken in conjunction with accompanying drawings in which.

DETAILED DESCRIPTION OF THE INVENTION

As a result of extensive research made by the present inventors for improving the characteristics of the tubular lining material disclosed in Japanese Patent Appln. No. 58-102361, it has not been found that the drawbacks of the prior art tubular lining materials are fully overcome and a new type tubular lining material possessing both pressure-resistance and earthquake-resistance in addition to all the useful properties required for tubular lining materials can be obtained by preparing a tubular lining material of a double-layered structure wherein an air-impervious tubular outer textile jacket overlaid with an air-impervious coat of a synthetic resin has been provided on the inside thereof with a reinforcing tubular textile jacket, under such selected condition that the reinforcing tubular textile jacket is larger in diameter and thicker in warps and weft than the air-impervious outer tubular textile jacket and the product of the length of the diameter and the elongation ratio in the direction of the diameter, on fracture, of the air-impervious outer tubular textile jacket is approximately equal to a product of the length of the diameter and the elongation ratio in the direction of the diameter, of the reinforcing inner tubular textile jacket.

In accordance with the present invention, there is provided a tubular lining material for reinforcing pipe lines, utilizable in a pipe-lining method wherein the tubular lining material with a binder on the inner surface thereof is inserted into the pipe lines and is allowed to advance within the pipe lines while turning the tubular lining material inside out under fluid pressure thereby applying the tubular lining material onto the inner surface of the pipe line with the binder being interposed between the pipe line and the tubular lining material, which comprises an air-impervious tubular textile jacket overlaid with an air-impervious coat of a synthetic resin and provided on the inside thereof with a reinforcing tubular textile jacket, characterized in that the reinforcing tubular textile jacket is more coarse in weaving density and larger in diameter than the airimpervious tubular textile jacket and that a product of the length of the diameter and the elongation ratio in the diameter direction, on fracture, of the air-impervious tubular textile jacket is approximately equal to the product of the length of the diameter and the elongation ratio in the diameter direction, on fracture, of the reinforcing tubular textile jacket.

In accordance with the present invention, there is also provided a tubular lining material for reinforcing pipe lines which has the same construction as described above but contains at given intervals in the lengthwise direction a portion where the pressure-resistance is weakened in comparison with the other portions so that when the pipe lines are cracked or fractured, the tubular lining material is also cracked only in the weakened portion to permit the leakage of a fluid transported through the pipe lines thereby providing a means for detecting the crack or fracture of the pipe lines.

The tubular lining material of the present invention has a double-layered structure wherein an air-impervious tubular textile jacket overlaid with an air-impervious coat of a synthetic resin (referred to hereinafter simply as the tubular textile jacket A) is provided on the inside thereof with a reinforcing tubular textile jacket (referred to hereinafter simply as the tubular textile jacket B). The pressure-reistance and the earthquake-resistance of the tubular lining material are enhanced by the double-layered structure. In the tubular textile jacket B positioned inside the tubular textile jacket A, the warps and the weft are thicker than those used in the tubular textile jacket A, thus making the tubular textile jacket B more coarse in weaving density than the tubular textile jacket A. Further, the tubular textile jacket B is larger in diameter than the tubular textile jacket A so that the impregnation of the tubular lining material with a binder and the evagination operation of the lining material within pipe lines can conveniently be carried out. Since the tubluar textile jackets A and B are approximately equal to each other in a product of the length of the diameter and the elongation ratio in diametric direction on fracture, the pressure-resistance of the tubular lining material is enhanced. The tubular lining material of this type constitutes a prime embodiment of the present invention and can be employed for reinforcing various kinds of pipe lines, particularly gas conduits, city water pipe lines and oil pipe lines buried in the ground.

The tubular lining material constituting another embodiment of the present invention has the same construction as in the above tubular lining material but contains in the tubular textile jacket B portions where the pressure-resistance is purposely decreased at given intervals in lengthwise direction. In these portions, the pressure-resistance is decreased in such a manner that the tubular lining material may just withstand the pressure of a fluid flowing in the pipe line. In case the pipe line is cracked or broken off, the tubular lining material is also damaged in the portions existing in the damaged portion of the pipe line to permit leakage of the fluid, thereby providing a means for detecting the location of the damaged pipe line buried in the ground. However, the use of the tubular lining material of this type is limited to the case wherein the fluid to be transported is harmless to the environment. Thus, the tubular lining material of this type can preferably be used for the purpose of reinforcing city water pipe lines but cannot generally be used for pipe lines for transporting gas or volatile combustible fluid.

The tubular textile jacket A is identical in structure and shape with that disclosed, for example, in Japanese Patent Publn. No. 59-12911 (U.S. Pat. No. 4,334,943) or Japanese Patent Publn. No. 58-38088 (U.S. Pat. No. 4,368,091) and can be manufactured be weaving warps and a weft each made of synthetic fibers in a tubular form and covering the resultant tubular textile jacket with an air-impervious coat of a synthetic resin. Utilizable as the synthetic fibers are those of polyamide, polyester, polyacrylic and polyurethane series. The use of polyester fibers is preferable in view of their high tenacity and durability. The synthetic fibers are used as filament yarns in such manner that several filament yarns are twisted to form warps and wefts. In order to weave warps and a weft in a tubular form, a weft is continuously woven spirally around warps vertically arranged in the form of an annular column whereby a twisted non-stretchable long filament yarn made of polyester fibers on an intertwisted yarn of the above filament yarn with a polyester long filament yarn or a polyester short filament yarn is preferably used for at least one of the warps and the weft.

The synthetic resin used for forming the air-impervious coat of the tubular textile jacket A is selected from various kinds of elastomeric or flexible synthetic resins such as polyester elastic resins, polyolefin resins, polyurethane resins, etc. For the purpose of reinforcing gas conduits or oil pipe lines, however, polyester elastic resins are preferably used to form the air-impervious coat on the tubular textile jacket A. For the purpose of reinforcing city water pipe lines, on the other hand, polyethylene resins are preferably used in accordance with the specific safety regulations for drinkable water.

The tubular textile jacket B can be manufactured in a similar manner from warps and a weft each made of synthetic fibers are used in the tubular textile jacket A. The synthetic fibers are preferably those of polyester series. The use of long filament yarns made of polyester fibers is particularly preferable. In the manufacture of a textile jacket in a tubular form of continuously weaving a weft spirally around warps vertically arranged in the form of an annular column, thicker warps and weft are used so that the weaving density may be coarse as compared with that of the tubular textile jacket A. The coarse structure of the tubular textile jacket B facilitates impregnation of the jacket with a binder so that a sufficient amount of the binder can be held in the interticies or texture of the textile jacket. As the tubular textile jacket B is larger in diameter than the tubular textile jacket A, the evagination operation of the tubular lining material within pipe lines can be carried out smoothly so that the fluid pressure necessary for the evagination may be reduced.

For the manufacture of the tubular lining material provided with a means for detecting the damaged portion of pipe lines, it is necessary to provide the tubular textile jacket B with portions where the pressure-resistance is decreased (about 10-20 cm in length) at given intervals (for example, from several meters to several ten meters) in lengthwise direction. For this purpose, the following device can be utilized:

(1) The weft in the tubular textile jacket B is cut over the length of 10-20 cm at given intervals in lengthwise direction previously to make portions where the pressureresistance is decreased.

(2) The use of yarns having a low tenacity, for example, thinner yarns for the weft in portions of the tubular textile jacket B where decrease in the pressure-resistance is desired.

The portions where the pressure-resistance is decreased purposely in the tubular textile jacket B is conveniently colored with a dye to distinguish the portions from other portions.

Two tubular textile jackets are subjected to a heat treatment to contract their diameters. In this heat treatment, one of the tubular textile jackets is so treated as to have a somewhat larger diameter than the other. The tubular textile jacket with a smaller diameter is then overlaid with an air-impervious coat of a synthetic resin according to a conventional coating method to manufacture the tubular textile jacket A. For example, the resin is once molten and applied from an annular extruder onto the exterior surface of the tubular textile jacket passing therethrough in inflated state to form a circle in cross section. In this case, the synthetic resin is allowed to penetrate sufficiently into interstices or textures of the textile jacket thereby assuring bonding of the resinous coat onto the tubular textile jacket by means of the so-called "anchoring action" of the resin. The thickness of the coat formed on the exterior surface of the tubular textile jacket A varies according to various factors, chiefly the diameter of the tubular textile jacket A. Usually, the coat is used with a thickness within the range of 0.2–2.0 mm, preferably 0.5–1.5 mm. If the thickness is extremely thin, the air-impervious property of the coat will be lost by the formation of pinholes or any mechanical damage of the coat during the evagination operation. The tubular textile jacket with a larger diameter is then inserted into the tubular textile jacket A in an appropriate manner to manufacture the tubular lining material of the present invention having a double-layered structure comprising the tubular textile jacket A and the tubular textile jacket B.

On application of the tubular lining material of this invention onto the inner surface of pipe lines according to any suitable pipe-lining method disclosed, for example, in U.S. Pat. No. 4,334,943, the tubular lining material is impregnated on the inner surface (on the side of the tubular textile jacket B) thereof with a binder whereby a sufficient amount of the binder is held by the tubular textile jacket B and the tubular textile jacket A is also impregnated with the binder to secure integral bonding of the tubular lining material onto the inner suface of the pipe lines. Various kinds of binders can be used but those of epoxy type are preferable. In case the binder is an epoxy type, an aromatic or aliphatic polyamine may be used as a curing agent.

Figure 1:
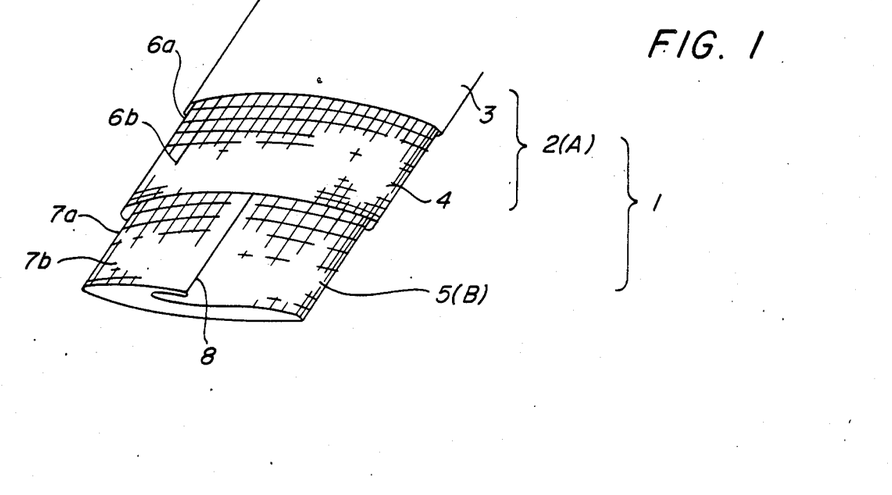
FIG. 1 is a partially broken perspective view showing a representative example of the tubular lining material of the present invention.

Referring to FIG. 1 showing perspectively a representative example of the tubular lining material of the present invention in flattened state, a tubular lining material 1 is comprised of the tubular textile jacket A 2 which is a tubular textile jacket 4 overlaid with an air-impervious coat 3 of a synthetic resin and the tubular textile jacket B which is a tubular textile jacket 5 positioned inside the tubular textile jacket A. As the tubular textile jacket 5 (or B) is somewhat larger in diameter than the tubular textile jacket 2 (or A), the former is folded at a turnover 8 extending in lengthwise direction. The tubular textile jacket 4 is manufactured by weaving a weft 6a spirally around warps 6b each made of synthetic fibers, while the tubular textile jacket 5 is manufactured by weaving a weft 7a spirally around warps 7b each made of similar synthetic fibers. The tubular textile jackets 2 and 5 are both subjected to a heat treatment to contract their diameters. The weft 7a and the warps 7b are thicker than the corresponding weft 6a and warps 6b.

The construction of the tubular lining material of the present invention will now be illustrated in more detail by way of a specific example with respect to the tubular lining material for a gas conduit having a nominal diameter of 300 mm.

An air-impervious tubular textile jacket 2 was manufactured according to the following method: A tubular textile jacket 4 was continuously woven with a weft 6a and warps 6b in a tubular form in such manner that 864 threads each comprised of a yarn made by twisting three 1,000 denier polyester filament yarns were used as warps 6b and a thread made by intertwisting four 1,100 denier polyester filament yarns with four 20S polyester spun yarns was used as a weft 6a and picked up at 45 pick count/10 cm of the warps to form a tubular textile jacket having a width of 532 mm in flattened state (338 mm in terms of outer diameter). The tubular textile jacket thus woven was subjected to a heat treatment to contract the width to 451 mm in flattened state (287 mm in terms of outer diameter). The tubular textile jacket 4 was then coated on the exterior surface thereof with a polyester elastic resin according to a conventional extrusion molding method to form an air-impervious coat 3 on the tubular textile jacket 4. The resultant tubular textile jacket 2 (or A) had a width of 444 mm is flattened state (283 mm in terms of outer diameter) wherein the weft picked up was 50 pick count/10 cm, the thickness of the jacket was 1.4 mm, the thickness of the coat 3 was 0.6 mm and a tensile strength in lengthwise direction was about 240 Kg/1 cm in width.

A tubular textile jacket 5 (or B) was manufactured according to the following method: A tubular textile jacket was woven with a splice-free weft 7a and splice-free warps 7b in a tubular form in such manner that 588 threads each comprised of a yarn made by twising six 1,000 denier polyester filament yarns were used as warps 7b and a thread made by twisting eight 1,100 denier polyester filament yarns was used as a weft 7a and picked up at 35 pick count/10 cm of the warps 7b to form a tubular textile jacket having a width of 532 mm in flattened state (338 mm in terms of outer diameter). The tubular textile jacket thus woven was subjected to a heat treatment to contract the width to 457 mm in flattened state (291 mm in terms of outer diameter). The resultant tubular textile jacket 5 (or B) had a thickness of 2.1 mm and a tensile strength in lengthwise direction of about 330 Kg/1 cm in width. The tubular textile jacket 5 was then inserted into the tubular textile jacket 2 (or A) according to a conventional method to manufacture a tubular lining material 1. FIG. 1 shows the tubular lining material 1 in this state.

The tubular lining material 1 can be applied onto the inner surface of a pipe line, for example, a gas conduit according to the following method:

The tubular lining material 1 is first provided on the inner surface thereof with a binder of epoxy type. This operation is carried out conveniently, for example, by evacuating the inside of the tubular lining material 1, injecting the binder into the interior space of the lining material, and then passing the tubular lining material enclosing the binder between a pair of nip rolls whereby any excess binder is squeezed out and the binder is uniformly dispersed in the interior space over the full length of the lining material. A sufficient amount of the binder can be held in the coarse texture of the inner tubular textile jacket B and the outer tubular textile jacket A can also be impregnated with a part of the binder penetrated through the texture of the tubular textile jacket B by the pressing action of the nip rolls. Any of the thermocurable binder can be used for this purpose but an epoxy type binder which affords high hardness after curing is preferably used together with a polyamine curing agent. In this specific example, a commercially available two-component epoxy-type binder consisting of an epi-bis-type epoxy resin as a main ingredient and a modified aromatic polyamine as a curing agent and having a mixed viscosity of 5,000 cps (measured by a B-type rotary viscosimeter in accordance with JIS K 6833, Item 6.3) was used conveniently. In this case, calcium carbonate was used as a filler. This binder was applied in an amount of about 4 Kg/m$^2$ onto the inner surface of the tubular lining material.

The tubular lining material provided on the inner surface thereof with the binder is then applied onto the inner surface of the gas conduit according to any appropriate conventional pipe-lining method, for example, the evagination-lining method disclosed in Japanese Patent Publn. No. 59-12911 or U.S. Pat. No. 4,334,943 wherein the tubular lining material containing the binder is introduced in flattened state into the gas conduit and allowed to advance within the conduit while evenginating the tubular lining material and at the same time bonding the evaginated lining material onto the inner surface of the conduit under fluid pressure. After completion of the lining treatment, a heating medium such as steam is passed through the gas conduit to cure the binder. In this specific example wherein compressed air was used as a pressurizing fluid, the fluid pressure required for evagination of the tubular lining material and bonding it onto the inner surface of the conduit was 0.6 Kg/cm$^2$ in case of a cast iron gas conduit having an inner diameter of 305 mm.

The tubular lining material 1 of the present invention has a specific double-layered structure comprising the outer tubular texile jacket A and the inner tubular textile jacket B, and thus exhibits excellent strength in lengthwise direction and satisfactory earthquake-resistance. In this specific example, the tensile strength of the tubular lining material was about 50 tons in total. In an experiment wherein pipe lines were merely contacted with each other, provided on the inner surface thereof with the tubular lining material and then pulled in opposite directions at both ends of the pipe lines while applying an inner pressure of 5 Kg/cm$^2$ to the pipe lines, the tubular lining material was detached over the length of 5 cm from the pipe lines by shearing detachment under a load of about 9 tons at the contact point of the pipe lines. This apparently means that the energy of the tensile force is absorbed by slight elongation of the tubular lining material and shearing destroy of the cured binder interposed between the pipe lines and the tubular lining material to permit detachment of the lining material from the pipe line over a certain length. It follows that if the pipe lines are destroyed by a strong external force such as earthquake, the tubular lining material will be detached from the pipe lines without being destroyed together with the pipe lines and will still function alone as a passageway for a fluid to be transported.

Figure 2:
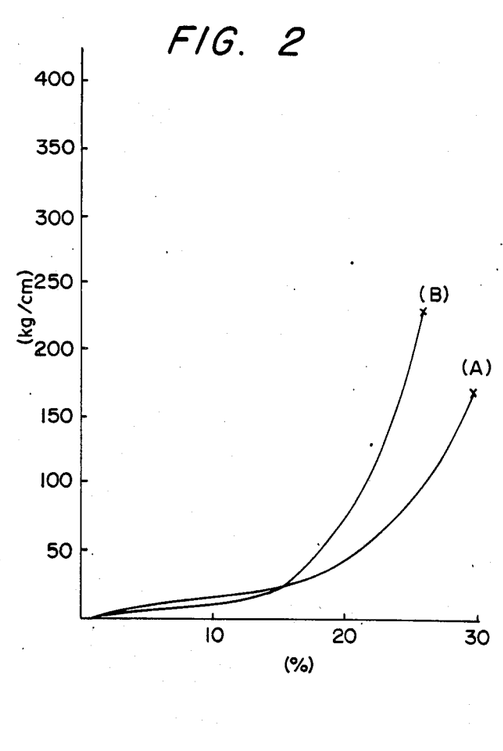
FIG. 2 is a graph showing the relation between the tensile strength in lateral direction and the elongation of the tubular textile jackets (A) and (B) used in the tubular lining material shown in FIG. 1.

FIG. 2 is a graph showing the relation between tensile strength and elongation of the tubular textile jackets A and B designated as (A) and (B) in the graph in lengthwise direction wherein the ordinate stands for stress in terms of Kg/cm while the abscissa for elongation in terms of percentage and the mark x stands for fracture of the tubular textile jacket. In the above specific example, the relation between tensile strength and elongation of the tubular textile jackets A and B in lengthwise direction per unit width (cm) was examined and a result of the examination is shown graphically in FIG. 2 from which it is evident that the tubular textile jacket 2 (or A) gave an elongation of 29.5% and fractured at a tensile force of 170 Kg, thus showing an elongation ratio of 1.295 while the tubular textile jacket 5 (or B) gave an elongation of 25.2% and fractured at a tensile force of 228 Kg, thus showing an elongation ratio of 1.252.

Figure 3:
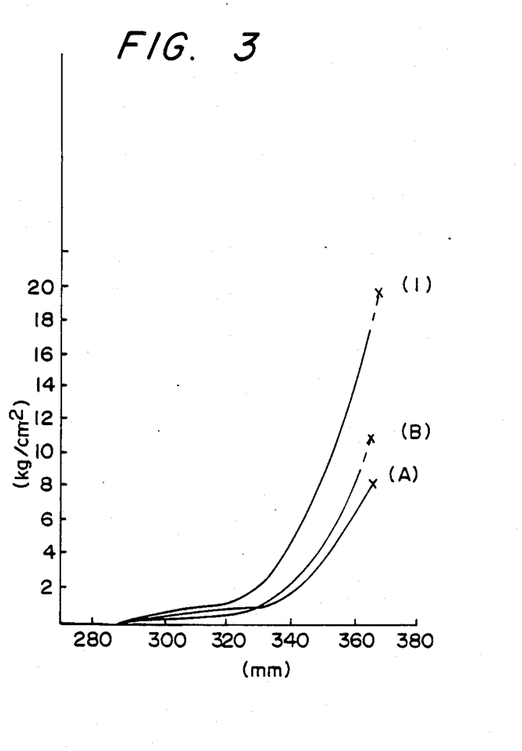
FIG. 3 is a graph showing the elongation in the diameter direction of the tubular lining material, the air-impervious tubular textile jacket (A) and the reinforcing tubular textile jacket (B) of the present invention.

FIG. 3 is a graph showing elongation in diametric direction of the tubular lining material and the tubular textile jackets A and B of the present invention designated as (1), (A) and (B), respectively, in the graph wherein the ordinate stands for inner pressure applied to the pipe line in terms of Kg/cm$^2$ while the abscissa for the length of outer diameter in terms of mm, and the mark X stands for fracture of the tubular lining material or the tubular textile jacket. In the above specific example, an air-tight pressure-resisting tube was inserted into the tubular textile jackets A and B and the tubular lining material each with 3 m in length and the relation between inner pressure and outer diameter of the testing materials as well as the pressure on fracture of the testing materials was examined and a result of the examination in shown in FIG. 3. As is evident from the graph, the tubular textile jacket 2 (or A) showed a pressure on fracture of about 9 Kg/cm$^2$ and an outer diameter of fracture of about 365 mm$\phi$, while the tubular textile jacket 5 (or B) showed a pressure on fracture of about 11 Kg/cm$^2$ and an outer diameter on fracture of about 365 mm$\phi$. In contrast to this, the tubular lining material 1 showed a pressure on fracture of about 20 Kg/cm$^2$ and an outer diameter on fracture of about 365 mm$\phi$. These facts apparently proves that all of the tubular texile jackets and the tubular lining material fractured at an outer diameter of about 365 mm$\phi$ but the tubular lining material comprised of these two tubular textile jackets showed a pressure on fracture of 20 Kg/cm$^2$, the value being approximately the sum of the values of the pressure on fracture of the tubular textile jackets A and B. This is due to the reason that a product of the length of outer diameter (283 mm$\phi$) and the elongation ratio in diametric direction (1.295) of the tubular textile jacket 2 calculated as 366 mm$\phi$ is approximately equal to a product of the length of outer diameter (291 mm$\phi$) and the elongation ratio in diametric direction (1.252) of the tubular textile jacket 5 calculated as 364 mm$\phi$.

Thus, the fracture-resisting strength as a combination of the pressure-resistance and the earthquake-resistance of the tubular lining material cannot be enhanced unless the elongation ratio in diametric direction of the tubular textile jacket 2 is approximately equal to that of the tubular textile jacket 5. If the elongation ratio in diametric direction is different between the tubular textile jacket 2 and the tubular textile jacket 5, fracture of the tubular textile jackets will occur first in either of the tubular textile jackets 2 and 5 having a lower elongation ratio in diametric direction. It is evident therefore that the elongation ratios in diametric direction of the tubular textile jackets A and B should approximately be equal to each other in order to enhance the fracture-resisting strength of the tubular lining material.

Even if the tubular lining material is exposed by separation of the pipe lines as seen in the foregoing earthquake-resistance test or the pipe lines are cracked or broken off to expose the tubular lining material, the exposed tubular lining material still has a pressure-resistance much higher than the inner fluid pressure (about 4 Kg/cm$^2$ in this specific example) and there will be a very little danger of fracture in the exposed tubular lining material even if superannuation or deterioration of the lining material with the lapse of time and any creeping effect on the lining material are taken into consideration.

As the tubular textile jacket B employs threads thicker than those used in the tubular textile jacket A, the weaving density of the former can suitably be reduced to obtain a much more coarse textile structure which makes it easier to evaginate the tubular lining material on applying it onto the inner surface of pipe lines. In addition, such coarse textile structure assures sufficient intake of a binder which is fully held in the coarse texture and can partly penetrate into the outer tubular textile jacket A, thereby enabling strong bonding of the lining material onto the inner surface of pipe lines.

Figure 4:
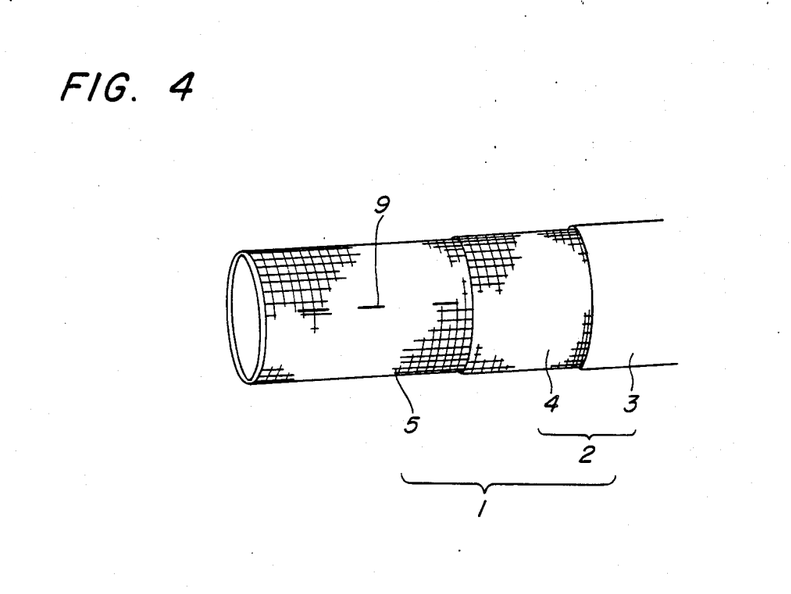
FIG. 4 is a partially broken away perspective view showing another example of the tubular lining material of the present invention.

In FIG. 4 which is a partially broken perspective view showing another example of the tubular lining material in inflated state, the reference numerals 1-5 used therein are of the same meanings as given in FIG. 1. The tubular lining material of this embodiment is quite identical in fundamental structure and the sort of materials used with that shown in FIG. 1 but is provided with a means for detecting the location of the damaged portion of the pipe lines. For this purpose, the weft in the tubular textile jacket B is cut for a certain length at given intervals in longitudinal direction of the tubular textile jacket. The construction of the tubular lining material of this embodiment will now be explained in more detail by way of the following specific example:

The tubular textile jacket 2 (or A) was manufactured according to the following method: A tubular textile jacket was woven with a weft 6a and warps 6b in a tubular form in such manner that 868 threads each comprised of a yarn made of twisting three 1,000 denier polyester filament yarns were used as warps 6b and a thread made by intertwisting two 1,000 denier polyester filament yarns with two 20S polyester spun yarns was used as a weft 6a and picked up at 50 pick count/10 cm to form a tubular textile jacket having a width of 532 mm in flattened state (338 mm$\phi$ in terms of outer diameter), which was then subjected to a heat treatment to contract the width to 451 mm in flattened state (287 mm$\phi$ in terms of outer diameter). The tubular textile jacket was then coated on the external surface thereof with a resin of polyethylene series according to a conventional extrusion molding method to form an air-impervious tubular textile jacket 2 (or A) which had a width of 444 mm in flattened state (283 mm$\phi$ in terms of outer diameter) wherein the weft picked up was 55 pick count/10 cm.

The textile structure and the weaving density of the tubular textile jacket 5 (or B) were same as in the tubular textile jacket B shown in FIG. 1 except that the weft 7a was cut over the length of about 10 cm in lengthwise direction of the tubular textile jacket at an interval of about 3 meters. This state is evident from FIG. 4 wherein the cut portion is arranged in lengthwise direction at an equal interval.

In the tubular lining material of this embodiment, the strength of the warps, i.e. the threads in lengthwise direction was equal to that of the tubular lining material shown in Table 1 and, as the result, the same effect was shown in the earth-quake-resistance test. In the tubular lining material of this embodiment, the strength in diametric direction of the tubular textile jacket 2 was 85 Kg/cm in width while that of the tubular textile jacket 5 was 228 Kg/cm in width in the portion where the weft had not been cut but was naturally 0 in the portion 9 where the weft had been cut. Using the tubular lining material of this embodiment having about 3 meter in length, the pressure on fracture was measured according to the same method as referred to in the explanation on FIG. 3, positioning the portion 9 at the center whereby the tubular lining material was cracked over the length of about 15 cm at an inner pressure of about 6 Kg/cm$^2$. Further experiment was made on this tubular lining material, considering the case of actually applying it onto the inner surface of a pipe line. More specifically, an asbestos pipe of 300 mm in inner diameter and 4 meters in length was provided on the inner surface thereof with the tubular lining material of this embodiment and a heavy load was added to the lined pipe over the full length thereof in lengthwise direction to destroy it. Next, a fracture test was made on the remaining tubular lining material whereby it was cracked only by about 17 cm, i.e. only in the portion where the weft had been cut at a pressure of about 6.5 Kg/cm$^2$.

Figure 5:
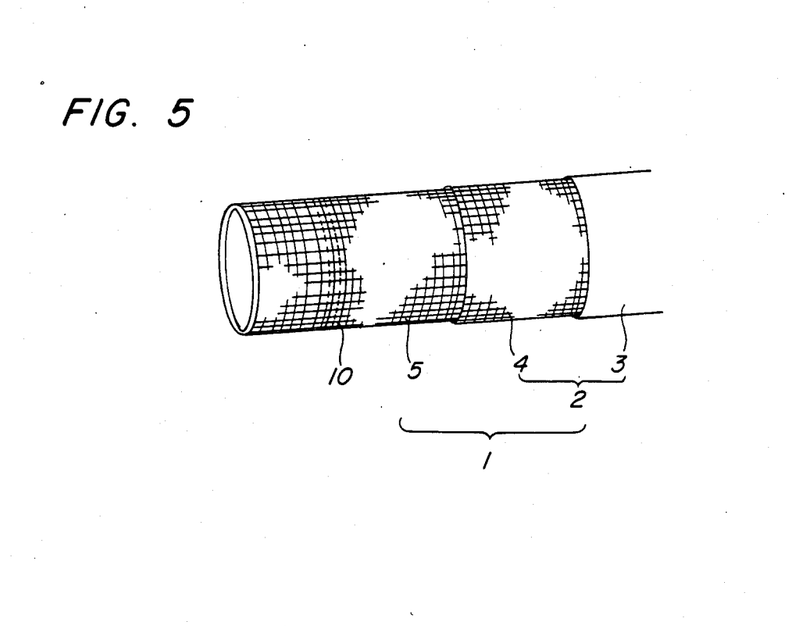
FIG. 5 is a partially broken away perspective view showing still another example of the tubular lining material of the present invention.

If FIG. 5 which is a partially broken perspective view showing still another example of the tubular lining material in inflated state, the reference numerals 1-5 used therein are of the same meanings as given in FIG. 1. The tubular lining material of this embodiment is a modification of the tubular lining material shown in FIG. 4 and provided with a means for detecting the location of the damaged portion of the pipe lines. Fundamentally, the structure of the tubular lining material shown in FIG. 5 is quite identical with that shown in FIG. 4 except that a portion 10 where the weft is substituted by a weak thead over a certain length is used in the former in place of the portion 9 in the latter. The construction of the tubular lining material of this embodiment will be explained in more detail by way of the following specific example:

The air-impervious tubular textile jacket 2 (or A) was quite identical with that shown in FIG. 4. The inner tubular textile jacket 5 (or B) was manufactured according to the following method: 558 threads each comprised of a yarn made by twisting six 1,000 denier polyester filament yarns were used as warps and a thread made by twisting eight 1,100 denier polyester filament yarns was used as a weft and picked up at 35 pick count/10 cm over the length of about 3 meters. Next, this weft was replaced by a weak thread made by twisting two 1,100 denier polyester filament yarns and picked up at 35 pick count/10 cm over the length of about 10 cm to form the portion 10. The weak thread was then replaced by the above mentioned weft and picked up at 35 pick count/10 cm to manufacture the tubular textile jacket 5 containing the portion 10. The tubular textile jacket thus woven was subjected to a heat treatment conducted similarly to the case of FIG. 4 to contract the width to 457 mm in flattened state (291 mm$\phi$ in terms of outer diameter) whereby the weft picked up was changed to 38 pick count/10 cm. The tubular textile jacket 5 thus manufactured was inserted into the tubular textile jacket 2 in a conventional manner to manufacture a tubular lining material provided with the portion 10. The strength in diametric direction of this tubular lining material was measured whereby the portion where the ordinary weft was used showed 228 kg/cm while the portion 10 where the weak weft was used showed 57 kg/cm in the tubular textile jacket B.

By providing the tubular textile jacket B with structurally weakened portions in which the jacket is woven with a weaker weft in a short length at given intervals in lengthwise direction, the length of any damaged tubular lining material can be minimized as compared with the length of the fractured pipe line. In general, city water is transported through an asbestos pipe line under a pressure of 4–5 kg/cm$^2$. Provided that the tubular lining material of this embodiment be applied to the asbestos city water pipe line, the tubular lining material will be cracked only over the length of 10–20 cm even in the case of the asbestos pipe line being significantly fractured over the length of 4 meter, thus, controlling the amount of leaking water minimum to detect damage of the pipe line. Unless the pipe line be fractured over a considerable length in longitudinal direction, the lining material will not be damaged since the expansion of the structurally weakened portion by fluid pressure can be inhibited by the pipe line positioned outside the lining material. Thus, the tubular lining material of this embodiment is not damaged under a pressure of 6–10 kg/cm$^2$. The tubular lining material of this type is effective for reinforcing the pipe line for a long period of time and tolerant to high pressure of a fluid transported through the pipe line unless the pipe line itself be damaged considerably by strong external force.

For the above reasons, the tubular lining materials shown in FIGS. 4 and 5 are extremely suitable for reinforcing city water pipe lines.

None of the prior art tubular lining materials can attain such remarkable technical merits when the pipe lines are damaged by an external shock such as earthquake. Thus, the tubular lining material of the present invention are particularly useful for reinforcing pipe lines buried in a soft ground or reclaimed land or in a district where a big earthquake is anticipated.

As many apparently widely different embodiments of the present invention may be made without departing from the spirit and scope thereof, it is to be construed that the present invention is not limited to the specific embodiments thereof except as defined in the appended claims.

What is claimed is:

1. A tubular lining material for reinforcing pipe lines, utilizable in a pipe-lining method wherein the tubular lining material, having a binder disposed on the inner surface thereof, is inserted into a pipe line and is allowed to advance within the pipe line as the tubular lining material is turned inside out under fluid pressure whereby the tubular lining material is applied to the inner surface of the pipe line with the binder being interposed between the pipe line and the tubular lining material, said tubular lining material comprising an air-impervious outer tubular jacket coated with an air-impervious outer layer of a synthetic resin and provided on the inside thereof with a reinforcing inner tubular textile jacket, characterized in that the inner reinforcing tubular textile jacket is more coarse in weaving density and larger in diameter than the outer air-impervious tubular textile jacket but has a folded over portion to permit it to fit within said outer textile jacket wherein the product of the length of the diameter and the elongation ratio in the direction of the diameter, on fracture, of the air-impervious outer tubular textile jacket is approximately equal to the product of the length of the diameter and the elongation ratio in the direction of the diameter, on fracture of the reinforcing inner tubular textile jacket.

2. The tubular lining material according to claim 1, wherein the air-impervious outer tubular textile jacket and the reinforcing inner tubular textile jacket are contracted in the direction of their diameter.

3. The tubular lining material according to claim 2, wherein the air-impervious outer tubular textile jacket and the reinforcing inner tubular textile jacket are approximately equal in diameter on weaving.

4. The tubular lining material according to claim 1, wherein the reinforcing inner tubular textile jacket is thicker in warps and weft than the air-impervious outer tubular textile jacket.

5. The tubular lining material according to claim 1, wherein the reinforcing inner tubular textile jacket contains, at given intervals in the lengthwise direction, portions in a definite length wherein the pressure-resistance is weaker than that in other portions.

6. The tubular lining material according to claim 5, wherein the weft is cut in the portion where the pressure-resistance is weaker in the reinforcing inner tubular textile jacket.

7. The tubular lining material according to claim 5, wherein the weft is weaker in strength in the portion where the pressure-resistance is weaker in the reinforcing inner tubular textile jacket.

8. The tubular lining material according to claim 1, wherein at least the reinforcing inner tubular textile jacket among the air-impervious outer tubular textile jacket and the reinforcing inner tubular textile jacket is woven with splice-free warps and a splice-free weft in tubular form.

9. The tubular lining material of claim 1, wherein said fold over portion extends in the lengthwise direction of the inner tubular textile jacket.

10. A tubular lining material according to claim 1, wherein the reinforcing tubular textile jacket alone or together with the air-impervious tubular textile jacket has been woven in seamless fashion with splice-free warps and a splice-free weft.

* * * * *